United States Patent [19]

Vaughan

[11] 4,408,872
[45] Oct. 11, 1983

[54] COMBINED STORING, TRANSPORTING, EXPOSING AND PROCESSING APPARATUS FOR CAMERA

[75] Inventor: Quentin D. Vaughan, Hollywood, Fla.

[73] Assignee: Visual Graphics Corporation, Tamarac, Fla.

[21] Appl. No.: 353,637

[22] Filed: Mar. 1, 1982

[51] Int. Cl.³ .............................................. G03B 29/00
[52] U.S. Cl. ........................................ 355/28; 355/64
[58] Field of Search ................. 355/27, 28, 45, 60, 355/64; 354/283

[56] References Cited

U.S. PATENT DOCUMENTS

| | | | |
|---|---|---|---|
| 2,415,424 | 2/1947 | Gaebel | 355/60 |
| 2,751,814 | 6/1956 | Limberger | 355/28 |
| 3,055,266 | 9/1962 | Frantz et al. | 355/45 X |
| 3,259,046 | 7/1966 | Nishimura | 354/283 |
| 3,398,638 | 8/1968 | Frohlich | 355/60 |
| 3,536,401 | 10/1970 | Mason et al. | 355/28 |
| 3,689,150 | 9/1972 | Nothmann et al. | 355/64 |
| 4,298,272 | 11/1981 | Stievenart et al. | 355/28 |

*Primary Examiner*—Richard A. Wintercorn
*Attorney, Agent, or Firm*—Albert F. Kronman

[57] ABSTRACT

Apparatus for storing, transporting, exposing and developing photosensitive film is disclosed in which a camera supports a table along which a carriage is slidable. The carriage serves to store and feed out lengths of film into a camera exposure station. A source of vacuum acting between a sheet of flexible plastic material and a translucent platen for the camera at the exposure station causes the film to be flattened against the platen for film exposure. Thereafter, the vacuum is broken by movement of the carriage and the exposed film is urged into the nip of rollers which carry the film through a developing station supported by the table.

20 Claims, 10 Drawing Figures

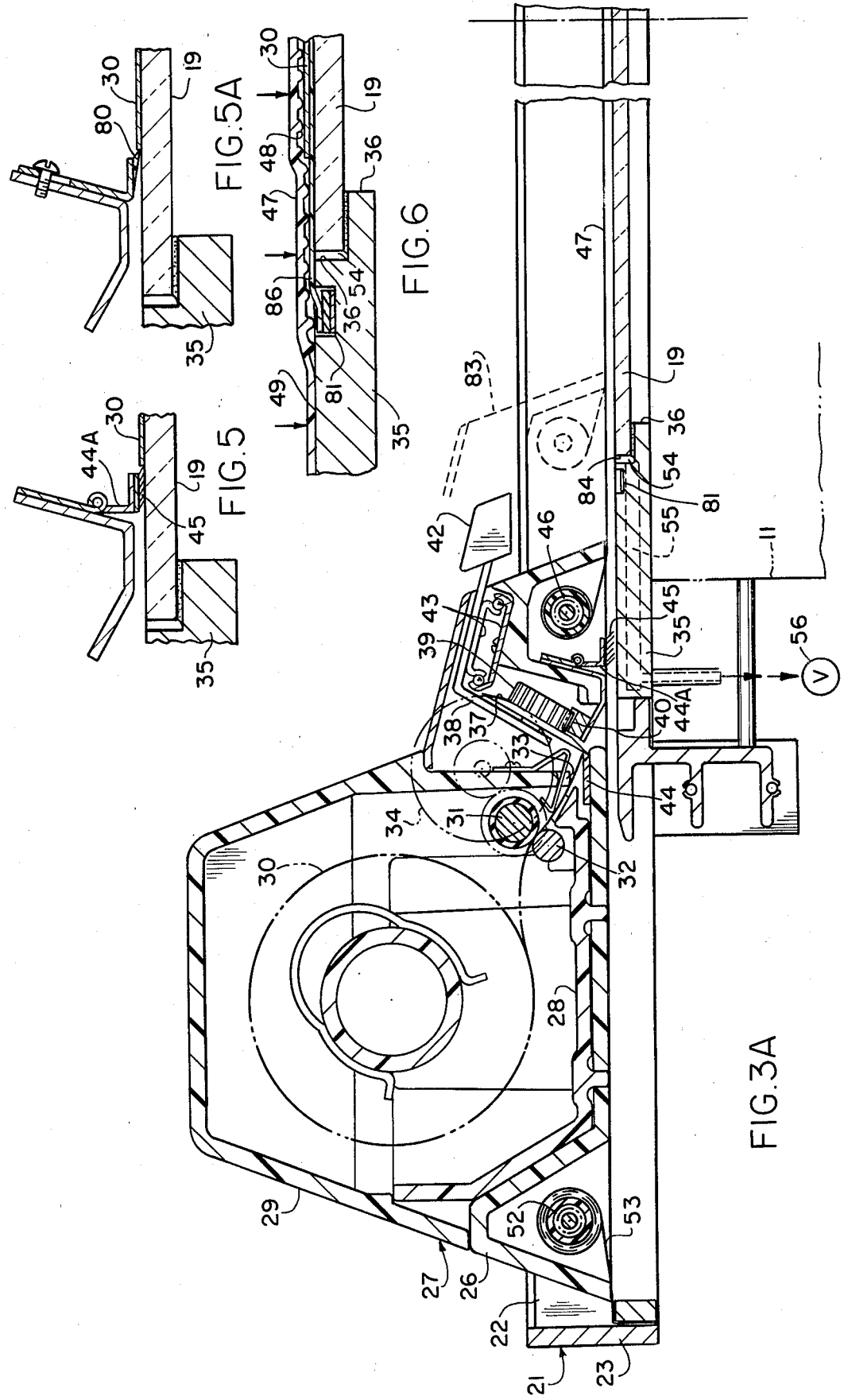

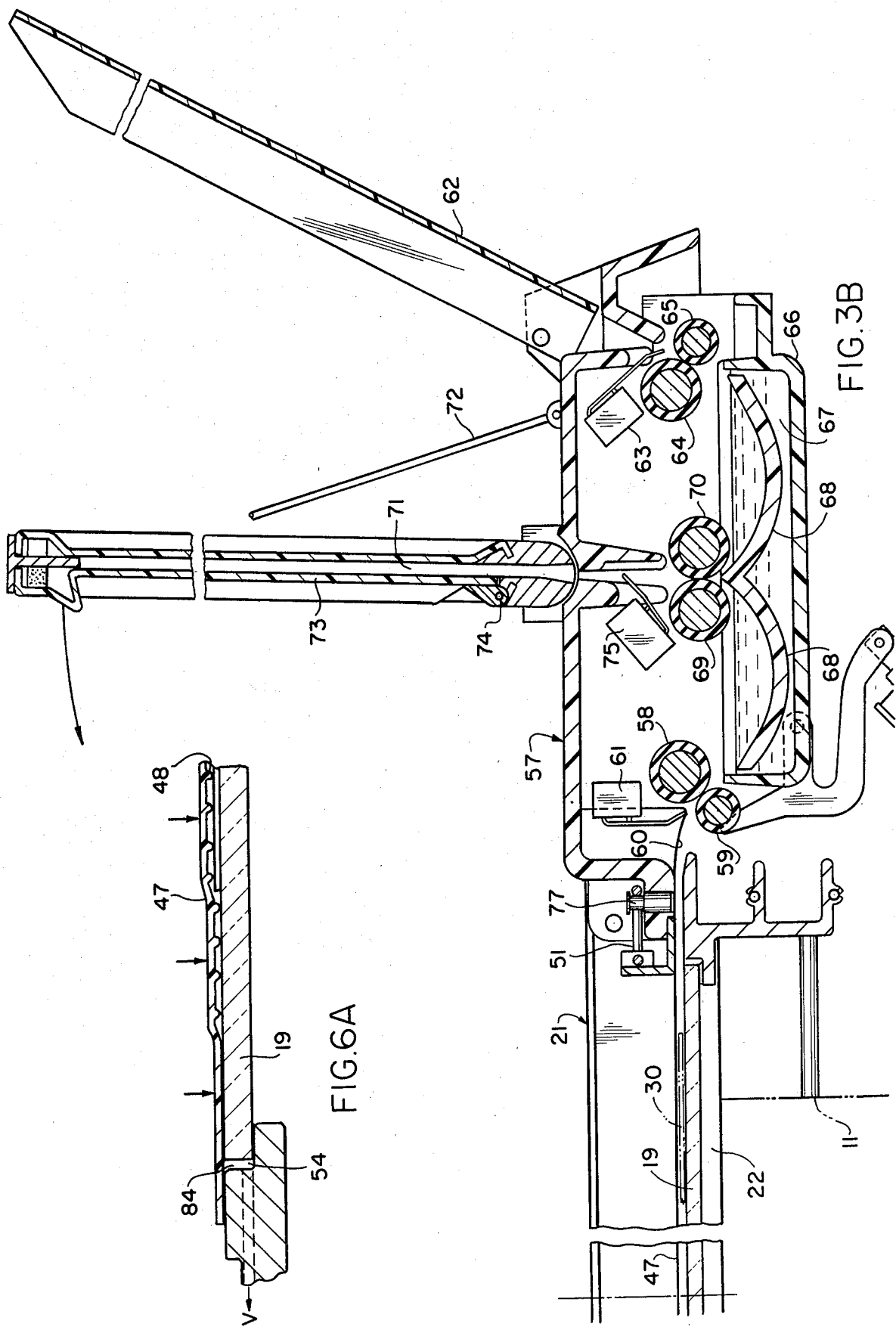

COMBINED STORING, TRANSPORTING, EXPOSING AND PROCESSING APPARATUS FOR CAMERA

BACKGROUND OF THE INVENTION

Most presently known cameras for large format reproduction of images such as graphic materials, photographs, or three dimensional objects employ light tight enclosures to prevent ambient light from exposing the photosensitive material being used. Other cameras employ a darkroom to which the camera is connected and within which the film is exposed and processed. Still others have exposing and developing stations into which the operator may thrust his hands through light excluding curtains to handle, adjust and tranport the photosensitive material.

In the present invention there has been provided a highly simplified apparatus suitable for attachment to a wide variety of cameras and which can be used with many types of photosensitive material and processing systems.

Accordingly, it is an object of the present invention to provide a combined film storing, transporting, exposing, and processing apparatus for cameras which may be used in ambient or reduced light.

Another object of the present invention is to provide apparatus which can be adjusted to produce different sizes of prints with very little equipment adjustment.

A further object of the present invention is to provide apparatus in which the film storing, transporting, exposing, and processing components are of a relatively small size while being capable of producing commercial size prints.

Still another object of the present invention is to provide apparatus for utilizing both black and white and color film as desired.

A feature of the present invention is its quick adjustability from print size to print size and operation to operation.

Still another feature of the present invention is its film handling mechanism which will not damage the photosensitive surface of the film or imaging material or the focal plane film support of the camera.

SUMMARY OF THE INVENTION

In one preferred embodiment of the present invention there is provided a support which is either attached to or made part of a large format camera. The support carries a transparent platen forming the image plane of the camera. A light tight transport housing enclosing a roll of photosensitive material is slidably carried upon the support at one end thereof and a film processing station is secured to the opposite end of the support. A flexible plastic sheet is secured at one end to a spring loaded roller on the transport housing with its free end extendable across the platen in the direction of the processing station. The plastic sheet material is either opaque or made of a safe light filter. A second sheet of opaque flexible plastic material is carried upon a spring loaded roller secured to the transport housing on the side opposite the first roller. A source of vacuum is connected to the platen along at least one side of the periphery of said platen. When it is desired to make a print, the flexible plastic sheet is extended across the platen and secured in place at the processing station end thereof. The photosensitive material is then fed out of the light tight transport housing beneath the flexible plastic sheet for a length sufficient to accommodate the desired print. The sheet is then cut off the roll and vacuum applied to the platen.

The vacuum causes the plastic sheet to be compressed against the photosensitive material thereby flattening it against the platen. The exposure is then made and the vacuum broken.

The light tight transport housing is next rolled along the support in the direction of the processing station and urges the exposed sheet into the processing station. As the housing is moved, the flexible sheet is taken up upon its roller by the operation of the roller spring while the opposed flexible sheet on the housing is unrolled to prevent stray light from getting into the camera and being reflected upon the photosensitive material. As soon as the exposed sheet is received by the processing station, the light tight transport housing is slid back into its original position and the printing operation can be repeated or another printing operation set up for exposure.

BRIEF DESCRIPTION OF THE DRAWINGS

In the accompanying drawings forming part hereof similar elements have been given the same reference numerals, in which drawings:

FIGS. 3A and 3B are views taken on line 3A–3B of FIG. 1.

FIGS. 5 and 5A are fragmentary views taken on line 5—5 in FIG. 1 on an enlarged scale.

FIGS. 6 and 6A are fragmentary views taken on line 6—6 and line 6A—6A in FIG. 1, showing the action of the vacuum source upon the light safe flexible sheet with and without a half tone screen.

DETAILED DESCRIPTION

In the accompanying drawings there is shown a combined film storing, transporting, exposing, and processing apparatus for a camera. The present disclosure is directed, by way of illustration, to the use of the applicant's invention with a diffusion transfer imaging system and a vertical camera. It will be understood, however, that the present invention may be used with other cameras and systems including heat processing systems, photographic wet processing systems and various other dry processing systems in which a sheet of photosensitive material is placed upon a platen in the focal plane of a camera, exposed to produce an image thereon or a latent image thereon and thereafter developed.

By the term "film" as used herein, it is intended to mean any material such as a paper sheet or plastic foil having a photosensitive layer thereon or capable of producing an image of an object photographed by the camera.

It is not intended that the present invention be limited to any specific type of processor, the illustrated processor for diffusion transfer material being solely for the purposes of illustration.

Figure 1:
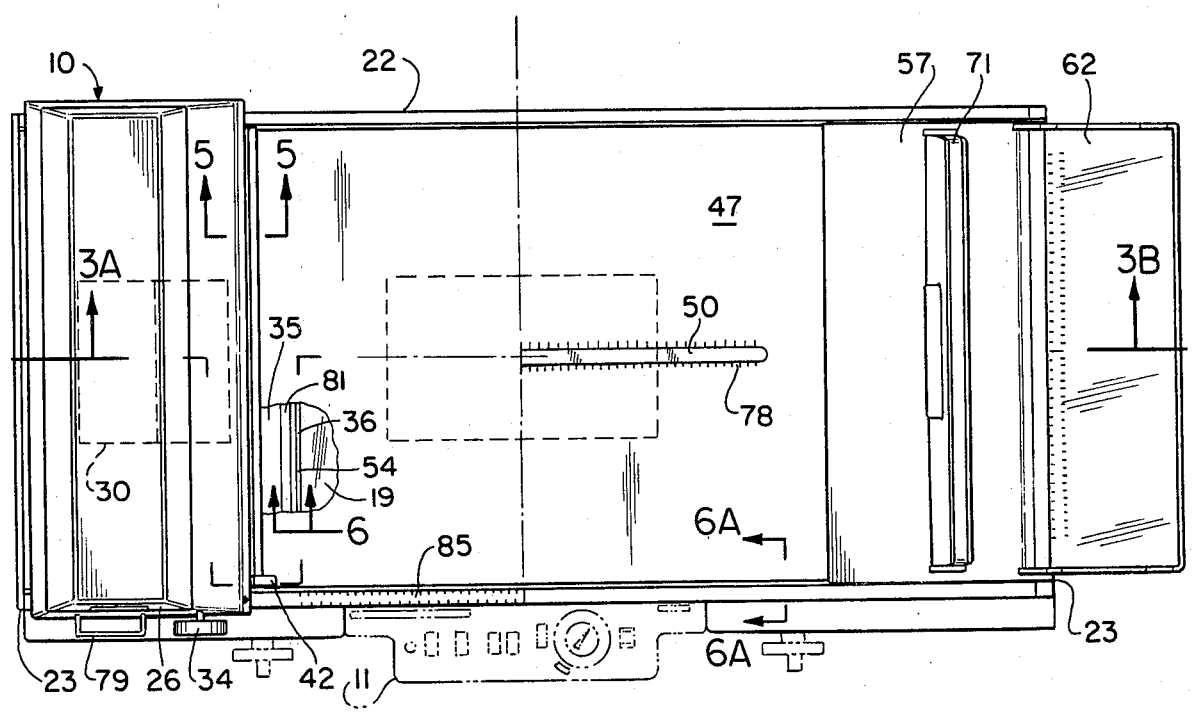
FIG. 1 is a top plan view partially broken away of a complete embodiment of the present invention.
Figure 2:
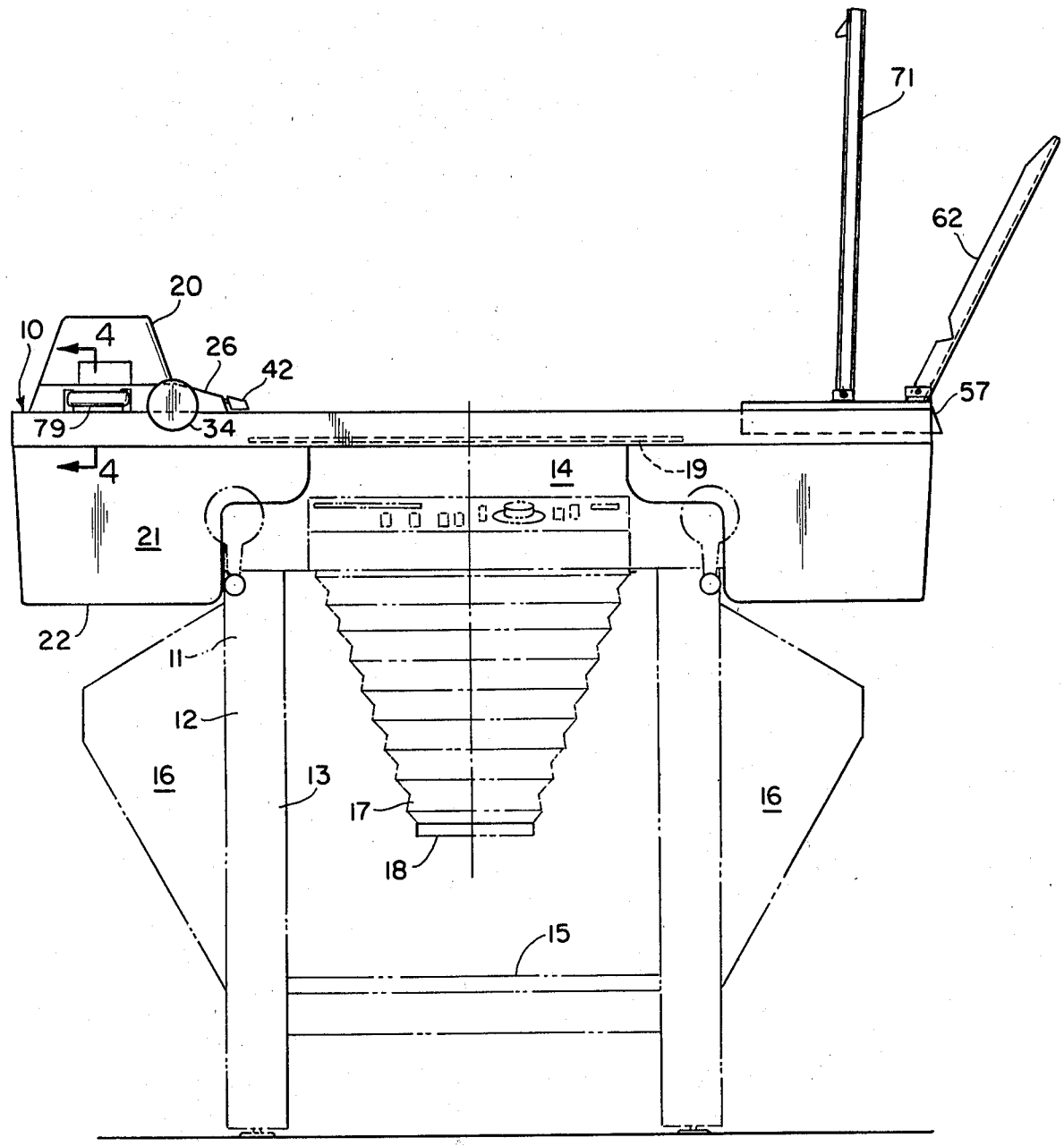
FIG. 2 is a view in side elevation of the embodiment of FIG. 1.

Referring to FIGS. 1 and 2 there is shown a combined film storing, transporting, exposing, and processing apparatus 10 mounted upon a large format camera 11. The camera 11 is constructed with a frame 12 formed of spaced vertical legs 13, top horizontal members 14 secured to the legs 13 and bottom horizontal members 15 secured to said legs. The camera frame 12 is provided with housings 16 which carry the well-known lamps (not shown) for illuminating the material to be photographed. The camera bellows 17 is secured at its narrow end to a lens board 18. The wide end of the camera bellows 17 is coupled to a transparent platen 19. The upper surface of the platen 19 serves as the focal plane of the camera.

Figure 4:
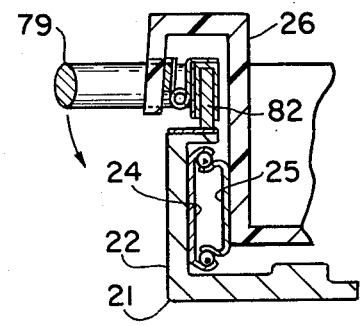
FIG. 4 is a cross sectional view taken on line 4—4 in FIG. 2.

As best shown in FIG. 2 a transport section 20 is slidably carried upon a bed 21 secured to the horizontal top members 14 of the camera frame 12. The bed 21 is preferably made of metal or some other suitable rigid material and consists of spaced parallel side members 22 and spaced parallel end members 23. The inner faces of the side members 22 are provided with elongated tracks 24 (see FIG. 4) which form part of a slide bearing assembly 25 on each side of the bed 21.

A carriage 26, hereinafter referred to as the cassette carriage, is secured to the movable portion of the slide bearings 25. The cassette carriage serves to move the transport section 20 as hereinafter more fully described.

The construction of the transport section 20 can be more clearly understood from an examination of FIG. 3A from which it will be seen that the cassette carriage 26 receives a light tight cassette housing 27 consisting of a base 28 and a cover 29. When in use with a roll of photosensitive material 30 loaded therein, the base 28 and cover 29 are secured together in the manner shown in FIG. 3A.

When the cassette housing 27 is initially loaded with film 30 (which may be done in a darkroom) the leading edge of the film is guided through a first pair of rollers 31, 32, which rollers direct the film through a slot 33 formed between the bottom of the cassette housing base 28 and the cover 29. A small control knob 34 shown in FIG. 1 is employed to rotate the rollers 31,32 to advance additional film out of the cassette housing 27 and onto and across a table 35 carried by the bed 21 of the transport section 20. The table 35 also carries the camera platen 19 within a window 36 of the said bed. It will be seen that as the sheet of film is fed out of the said cassette with its photosensitive face down, it will be guided across the platen 19 and lie in the path of light directed through the camera.

When the photosensitive sheet of film 30 has been extended for the desired length necessary for the size image to be produced, it is cut from the supply roll by means of a rotary knife blade 37 best shown in FIG. 3A. The rotary knife blade 37 is pivotally carried on the end of an arm 38 and is secured to a spur gear 39 which is in mesh with a gear rack 40 attached to a bracket 41. An operating handle 42 is connected to the arm 38 and serves to move the rotary knife assembly along the slide bearing 43 which is carried by the bracket 41 so that the blade will sever the film as the rotary knife blade 37 passes across the shearing edge of a plate 44.

An elongated brush-like member 45 (best shown in FIG. 5) on a hinged plate 44A is disposed across the table 35 with the brush bristle ends in contact with the surface of the said table. The brush-like member 45 is located in the path of the film 30 as it emerges from the cassette 27. It will be noted that the bristles of the brush-like member are canted in the direction of the film feed so that it acts to prevent the film from moving back in the direction of the cassette once it has been fed past the bristles of the brush-like member. On the other hand, the hinged plate 44A causes the brush-like member to shift lightly upward when the carriage 26 is moved in the direction opposite the film feed as will be hereinafter more fully described. The result is a positive one-way clutching action for the film feed with a minimum of surface contact between the bristles, the film and the platen of the camera. Other one-way clutch-like members such as the wedge-shaped Teflon bar 80 shown in FIG. 5A mounted upon the vertically slidable plate may be substituted for the brush-like member, without departing from the present invention.

Secured at each end in the sides of the cassette carriage 26 is an elongated roller 46 (hereinafter referred to as the front roller and best shown in FIG. 3A). The front roller is spring loaded, in the well-known manner, so that it will return to its original position when released after being rotated several times. This mechanism can be compared to a shade roller which will not stop and lock at a set position. The front roller is located above the table 35 and slightly in advance of the leading edge of the film 30 as it is first fed out of the cassette 27. An elongated sheet 47 of some suitable flexible material such as vinyl, plastic, nylon or the like, is secured at one end to the front roller 46 and initially wrapped therearound so that the sheet is continually urged upon or taken up by the said roller.

Figure 7:
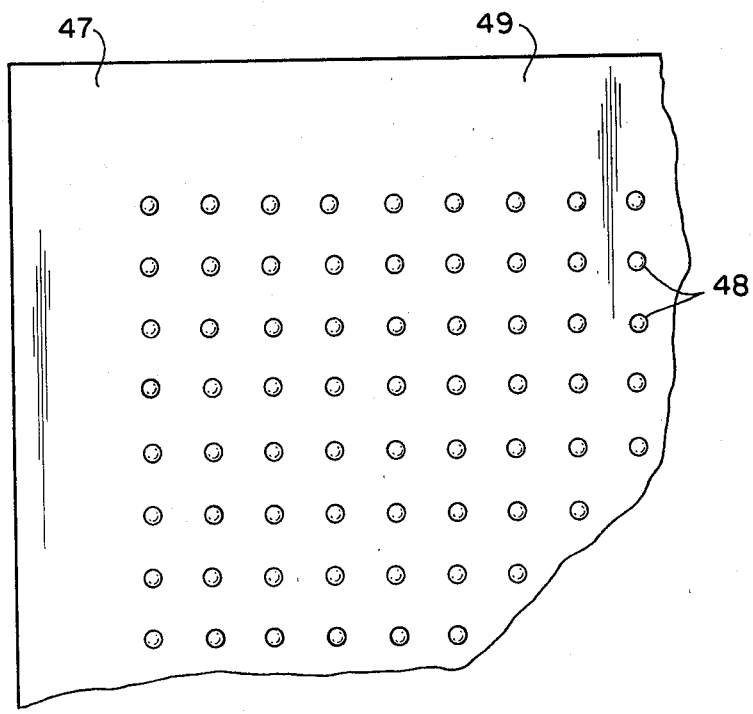
FIG. 7 is a fragmentary bottom view of a flexible plastic sheet useful in the present invention.

As best shown in FIGS. 6 and 7, the sheet 47 is provided with very small protuberances or embossments 48 which provide passages therebetween for air. A continuous flat strip portion is provided around the edges of the sheet 47 as indicated at 49, and serves to make good contact with that area of the surface of the table 35 and platen which it overlies. In addition, the sheet 47 may be provided with an elongated window 50 which may consist of a transparent section of material in an otherwise opaque flexible sheet. The window 50 provides an area through which the leading edge of film to be exposed may be observed. Where the film is color film, the window 50 will, of course, be eliminated. The free end of the flexible sheet 47 is secured to an elongated metal loop 51 by means of which the sheet 47 may be extended across the table top prior to the operation of the exposing section of the device.

A second roller 52, hereinafter called the rear roller is also carried by the cassette carriage in the sides of said carriage. The roller 52 is also spring loaded but in the opposite direction from the front roller. An elongated flat opaque flexible sheet 53 made of plastic material is secured at one end to the rear roller and at its other end to the bed 21 as best shown in FIG. 3A. It will be observed that when the cassette carriage 26 is at the extreme left end of the bed 21, the sheet 53 will be wound upon the roller 52. As the carriage 26 is slid away from the end of the bed 21, the sheet 53 will be unwound from the rotating roller 52 and overlie the surface of the table 35 to prevent light from getting into the camera. The sheet 53 is directed through a slot at the base of the cassette carriage 26 so that the carriage may freely move back and forth along the bed as the sheet 53 is extended or taken up.

The table 35 of the apparatus 10 is provided with one or more grooves and channels 54 inwardly spaced from its periphery and in communication with the upper surface of the table adjacent the platen. The grooves and channels 54 are connected to a conduit 55 which in turn is coupled to a vacuum source indicated at 56. The vacuum source is preferably an electrically driven pump (not shown).

A processing station 57, best shown in FIG. 3B, is carried by the bed 21 at the end opposite the cassette carriage. The processing station as illustrated, by way of example, is for a diffusion transfer system but it is within the purview of the present invention to provide other processing means depending upon the photosensitive film employed within the system. The processing station consists of a first set of processing rollers 58, 59 having a nip therebetween to receive the leading edge of the film 30 after it has been exposed. A guide 60 serves to direct the film 30 into the nip. The film 30, as it reaches the nip, triggers a microswitch 61 which activates the power source (not shown) for the rollers 58, 59. The rollers 58, 59 are preferably motor driven and lead the exposed film into a developing solution tank 66. The microswitch 61 also energizes a brake indicated at 82 in FIG. 4 which locks the cassette carriage 26 to the bed 21 thereby stopping the travel of the carriage after the film has reached the nip of the rollers 58, 59. The film is thereby prevented from buckling in its travel into the processor.

A chute 62 to guide a sheet of receptor material (not shown) is carried by the processing station and serves to direct the receptor material past a microswitch 63 into the nip of drive rollers 64, 65. The drive rollers 58, 59, 64, 65, when activated, serve to feed the negative film 30 and the receptor sheet into a tank 66 of developing solution 67.

Guides 68 in the tank 66 direct the negative film and receptor sheet into the nip of squeegee rollers 69, 70 which direct the then pressed together negative film and receptor sheet into a developing chamber 71 from which they can be taken and peeled apart, in the well-known diffusion transfer manner, to produce a permanent positive image.

The developing chamber 71 is supported by a wire prop 72 and a door 73 hinged at its bottom as shown at 74 is provided for easy access to the developed material.

Microswitch 75, disposed in the path of the squeegeed film and receptor sheet senses their arrival at the developing chamber 71 and can actuate a timer (not shown) to indicate the end of the required developing interval.

From the foregoing, the operation of the apparatus will be apparent as follows:

Assuming that the roll of photosensitive film 30 is in place within the cassette 27 and the leading edge of the film fed into the nip of the rollers 31, 32 and also that the developing solution 67 has been placed within the tank 66, the operator grasps the free end of the flexible plastic sheet 47 and pulls it across the table 35 so that the platen 19 of the camera is covered at all times during film exposure. The free end of the flexible sheet is secured to a post 77 at the processor end of the bed 21. The protuberances of the flexible sheet now face downwardly and are in contact with the top of the table 35 and the platen 19. The cassette carriage 26 is moved toward the processing station a short distance as indicated in dashed lines at 83 in FIG. 3A. When in this forward position, the flexible plastic 47 will uncover the port 84 of the vacuum channel 54. At this juncture, although running, the vacuum from the pump has not been applied to the spaces between the flexible sheet and the table because of the uncovered port 84. (The spaces have been greatly exaggerated in the drawings for the sake of clarity.) The copy material having been previously placed upon the copy board of the camera, it is assumed that the camera has been adjusted so that the image of the copy is in focus upon the image plane of the camera.

As shown in FIG. 1, a scale 85 is located on the top of the bed 21. This scale is used by the operator so that when the film is advanced out of the carriage 26 it may be cut off to provide a piece of film of the desired length with the cut film located on the optical center of the camera. The photosensitive film 30 is then advanced across the top of the table 35 by turning the knob 34. The film advances beneath the rotary knife blade 37 under the brush-like member 43 and between the flexible plastic sheet 47 and the top of the table. When the leading edge of the photosensitive film material 30 lines up with the indicia 78 on the window 50 in the said sheet, the rotation of the knob 34 is stopped and the rotary knife transported across the front of the cassette by means of handle 42 to cut the advanced photosensitive material to the desired length.

By returning the cassette carriage 26 to the position shown in FIG. 3A, the flexible plastic sheet covers the port 84 and the vacuum from source 56 is applied to the spaces below the flexible plastic sheet and pulls the air between the flexible plastic sheet 47 and the top of the photosensitive material out of the spaces provided by the protuberances 48. Atmospheric pressure thus forces the flexible plastic sheet against the photosensitive film causing it to flatten uniformly against the focal plane of the camera for satisfactory imaging, as indicated by the arrows in FIG. 6A. The flat strip portion 49 is also flattened upon the surface of the table 35 which it overlies to seal out ambient air and light. The camera exposure is then made, following which, the vacuum is again broken by advancing the cassette carriage 26 permitting ambient air to enter the spaces beneath the flexible sheet 47 and releasing the pressure of the sheet against the photosensitive film.

The operator then grasps the handle 79 on the cassette carriage 26 to advance the cassette carriage 26 across the table 35 in the direction of the processing station 57. As the cassette carriage 26 advances, the brush-like member 43 picks up the trailing edge of the film material 30 and urges it along the table and into the nip of processing rollers 58, 59 as shown in FIG. 5. When the cassette carriage 26 advances, the flexible sheet 47 is taken up upon the front roller 46 and the flexible sheet 53 on the rear roller 52 is payed out.

As the leading edge of the photosensitive material 30 leaves the table 35 it actuates the microswitch 61 which starts a motor (not shown) employed to rotate the rollers 58, 59, 64, 65, 69 and 70 in the processor in accordance with well-known processing technology. The photosensitive film is then directed through the developing tank 66 and up into the developing chamber 71. At the same time, other rollers in the processing station feed a sheet of receptor material through the tank 66 and into contact with the film for diffusion transfer processing. The operator then moves the cassette carriage 26 back to its original position to repeat the printing operation.

If desired, certain filters or screens 86 may be placed on the platen 19 between the platen and the photosensitive film 30. The filters or screens are secured at one end in a recess 81 in the table 35 as shown in FIG. 6 where a half tone screen 86 used for photographic reproduction is indicated. The filters or screens 86 are of a size which will not interfere with the action of the vacuum source but will overlie the platen 19 of the camera.

Having thus fully described the invention, what is desired to be claimed and secured by Letters Patent is:

1. Apparatus for use in combination with a camera having an object plane and an image plane comprising:
   a. an elongated table coupled to the camera having a top surface parallel to the image plane of the camera;
   b. a film transport section slidably carried on the table at one end thereof;
   c. a light tight cassette on the transport section;
   d. a supply of imaging film in said cassette;
   e. means carried by the transport section to advance at least a portion of the imaging film from the cassette on to the table;
   f. A translucent platen carried by the table to receive light directed through the camera from the object plane;
   g. an elongated flexible sheet of light filtering material yieldably secured at one end within the transport section and adapted to be extended from said transport section along the table to overlie the platen;
   h. control means to advance the imaging film across the table and beneath the light filtering material to overlie the platen;
   i. at least one groove in the top surface of the table adjacent the platen and beneath the elongated flexible sheet;
   j. a vacuum source coupled to said groove;
   k. means to control the vacuum source to evacuate air from the space between the flexible sheet and the platen to bring the film into uniform contact upon the platen;
   l. a processing station carried by the table opposite the transport section;
   m. means to interrupt the vacuum source to release the atmospheric pressure against the flexible sheet and the film; and,
   n. film advancing means carried by the transport section to urge the film into the processing station as the transport section is advanced along the table in the direction of said processing station.

2. Apparatus according to claim 1 in which the table is carried by a bed secured to the camera, said bed having upstanding parallel side members and elongated tracks on said side members to support the film transport station.

3. Apparatus according to claim 1 in which the film transport section includes a carriage, a cassette housing on said carriage and a spring loaded roller at the front of the carriage to receive one end of the flexible sheet.

4. Apparatus according to claim 3 in which the film transport section is provided with a transverse shear disposed in the path of the imaging film fed from the cassette whereby the said film may be cut into desired lengths.

5. Apparatus according to claim 3 in which the imaging film is directed into a pair of feed rollers journaled within the cassette, said rollers being operatively coupled to the control means to advance the imaging film across the table.

6. Apparatus according to claim 1 in which the top surface of the platen is the image plane of the camera.

7. Apparatus according to claim 3 in which the spring loaded roller is under tension to yieldably take up the flexible sheet.

8. Apparatus according to claim 1 in which the elongated flexible sheet is formed of a material which excludes substantially all light which would expose the photosensitive film.

9. Apparatus according to claim 1 in which the elongated flexible sheet is provided with a window through which the leading edge of the imaging film may be viewed for positioning.

10. Apparatus according to claim 1 in which the elongated flexible sheet is formed with a pattern to provide passages therebetween for the passage of air between the said sheet and the film.

11. Apparatus according to claim 10 in which the elongated flexible sheet is provided with a continuous flat strip-like portion around the edges thereof.

12. Apparatus according to claim 10 in which the pattern consists of a plurality of protuberances on the surface facing the table.

13. Apparatus according to claim 1 in which the flexible sheet is provided with securing means at the free end thereof to hold it in an extended position overlying the film at all times after the film leaves the cassette end until it is within the processing station.

14. Apparatus according to claim 4 in which the film advancing means comprises an elongated member carried across the path of the film and engagable with the trailing edge of the film after it has been sheared from the supply.

15. Apparatus according to claim 14 in which the elongated member is movably secured to the transport section so as to shift upwardly as the transport section is moved in a direction away from the processing station.

16. Apparatus according to claim 15 in which the elongated member is a brush-like member having a plurality of bristles canted in the direction of the film feed.

17. Apparatus according to claim 3 in which the film transport section includes a second spring loaded roller at the rear of the carriage and a flexible sheet of opaque material secured at one end to said second roller and at its other end to the table whereby said opaque sheet will unroll from the second roller as the carriage is moved toward the processing station to overlie the table and be taken up by the second roller as the carriage is returned to the end of the table opposite the processing station.

18. Apparatus according to claim 11 in which the means to control the vacuum source comprises the elongated flexible sheet, a port in the top surface of the table in communication with ambient air and the flat strip in the said elongated strip, whereby proper positioning of the transport station along the table will cause the flexible sheet to cover or open said port.

19. Apparatus according to claim 1 in which the processing station includes a first set of processing rollers in line contact with each other, said rollers hving a nip therebetween to receive the exposed film, a switch means in the path of the exposed film as it enters the switch and a brake member carried by the film transporting section and operatively connected to the said switch to stop the movement of the said transporting section when the exposed film reaches the nip of the first processing rollers.

20. Apparatus according to claim 19 in which the brake is an electro-magnetic brake.

* * * * *